United States Patent Office 3,594,267
Patented July 20, 1971

3,594,267
REINFORCING PROCESS
David S. Breslow, Wilmington, Del., assignor to
Hercules Incorporated, Wilmington, Del.
No Drawing. Filed Sept. 22, 1969, Ser. No. 860,017
Int. Cl. B32b 27/40; C09j 3/12, 5/02
U.S. Cl. 161—231                                    5 Claims

ABSTRACT OF THE DISCLOSURE

The adhesion of fibrous polyester reinforcing material to rubber stock can be improved by treating the fibrous material with an isocyanato substituted aromatic sulfonyl azide having the formula $$(N_3O_2S)_x\text{—}A\text{—}[(R)_y\text{—}NCO]_z$$

where A is an aromatic radical, R is an organic radical selected from alkylene, unsaturated alkylene, cycloalkylene and arylene radicals, $y$ is an integer from 0 to 1 and $x$ and $z$ are integers from 1 to 5. Vulcanized rubber tires reinforced with treated polyester tire cord are disclosed.

This invention relates to a process of improving the adhesion of fibrous polyester reinforcing material to rubber stock and to the products so produced. In particular, this invention relates to a process of improving the adhesion of polyester fiber, including yarn, fabric and cord, to rubber stock by treatment of the fiber with an isocyanato substituted aromatic sulfonyl azide and to the products so produced.

It is known to reinforce rubber products with various types of reinforcing materials such as rayon, nylon, glass, and metal fibers. It is also known that polyester fibers are advantageous because of their higher initial modulus, low elongation, greater strength retention under humid conditions, and other improved properties. However, development in the use of polyester fiber has been slowed by the problems of achieving good adhesion between the fiber and rubber stock.

Now, in accordance with this invention it has been found that polyester fiber, including yarn, fabric, cord and the like, having good adhesion to vulcanized rubber stock can be prepared by modifying the fiber with an isocyanato substituted aromatic sulfonyl azide as described hereinafter. The fiber-to-rubber adhesion can be further improved for some usages if an adhesive coating is applied to the modified fiber. The coating frequently used is a dispersion of a phenol-aldehyde condensation copolymer (i.e. resin) and a vinyl pyridine containing rubber polymer latex. The modified polyester reinforcing material of this invention can be used in any type of rubber tire, including automobile, truck, tractor, and aircraft tires, as well as in rubber belting and rubber hose where low elongation, strength and dimensional stability are important.

The polyester fibers useful in the instant invention are made from the well-known polyesters obtained by reacting glycols, such as ethylene glycol, propylene glycol, cyclohexanedimethanol, and the like with dicarboxylic acids, such as terephthalic acid, isophthalic acid, stilbene dicarboxylic acid, and the like. In addition to the yarn, fabric or cord made from polyester fibers, combinations or blends of polyester fibers with, for example, cotton or rayon fibers can be used in this invention. Improved adhesion of the polyester fibers to rubber can be obtained by the process of this invention, no matter what the physical form of these fibers. However, as a practical matter the fibers so treated generally will have been previously twisted or plied into yarn or cord or may have been woven or knit into fabrics. Thus, this process is not limited to the treatment of cord. Various methods for the preparation of yarn, cord, fabric and other woven or unwoven fiber substrates are well known to those skilled in the art.

The isocyanato substituted aromatic sulfonyl azides used to treat the polyester fiber in accordance with this invention are isocyanato substituted aromatic compounds containing at least one sulfonyl azide group substituted directly on the aromatic nucleus. The isocyanato substituted aromatic sulfonyl azides are represented by the formula $$(N_3O_2S)_x\text{—}A\text{—}[(R)_y\text{—}NCO]_z$$

where A is an aromatic radical, R is an organic radical selected from alkylene, unsaturated alkylene, cycloalkylene and arylene radicals, $y$ is an integer from 0 to 1 and $x$ and $z$ are integers broadly each being 1 to 5, preferably each being 1 to 3.

Typical compounds represented by the foregoing generic formula include 4-isocyanatobenzenesulfonyl azide
4-isocyanatomethylbenzenesulfonyl azide
4-(4-isocyanatobutyl)-benzenesulfonyl azide
4-(4-isocyanatobutenyl-1)-benzenesulfonyl azide
4-(4-isocyanatophenyl)-benzenesulfonyl azide
4-(4-isocyanatocyclohexyl)-benzenesulfonyl azide These compounds range from liquids to solids at room temperature and atmospheric pressure. The sulfonyl azide radicals on these compounds become reactive when heated. They are believed to react with and become attached to the polyesters. As the temperature increases the over-all decomposition rate of the sulfonyl azide increases. The isocyanate portion of these compounds on the other hand are relatively heat stable. Without being bound by the theory of the reaction, it is believed that the sulfonyl azide radicals can be reacted by heating without affecting the isocyanate radicals.

The isocyanato substituted aromatic sulfonyl azides used in this invention can be prepared by various methods. For example, they can be prepared from the corresponding sulfonyl chloride-carbonyl chloride compounds by reaction with sodium azide followed by heating to rearrange the carbonyl azide to the isocyanate. This preparation can be shown as follows:

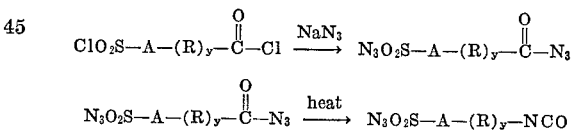

where A, R, and $y$ are as defined above. The first step in the reaction, i.e. the reaction with sodium azide, is conducted at a temperature below 10° C. in a mixed solvent such as acetone-water, ethyl alcohol-water, methyl chloride-acetone-water, or benzene-acetone-water. The second step of the reaction, i.e. the rearrangement of the carbonyl azide to the isocyanate, is carried out at temperatures of up to 100° C. in an inert organic solvent such as benzene or toluene.

The first step in the process of this invention is the modification of the polyester fiber by treatment with an isocyanato substituted aromatic sulfonyl azide. This is accomplished by contacting the fiber with an isocyanatosulfonyl azide compound as for example, by dipping, spraying, brushing, or running it over a coated roll with a solution of the isocyanato substituted sulfonyl azide in a suitable liquid. Exemplary of suitable organic solvents for the isocyanato substituted aromatic sulfonyl azides are benzene, toluene, acetone, ethyl acetate, methylene chloride, trichloroethylene, and the like. In the next step of the process, the thus treated fiber is heated to a temperature above the decomposition point of the sulfonyl azide groups resulting in surface modification of the fiber. In so doing, it is believed the sulfonyl azide portion or portions react with the polyester leaving the isocyanate portion or portions free for later reaction. This temperature will in general be from about 120° C. to about 250° C. Various amounts of the isocyanato substituted aromatic sulfonyl azide treating agents can be used. The optimum amount will depend upon the amount of modification desired, the specific isocyanato compound used, etc. In general, the amount added based on the fiber will be from about 0.1 to about 5.0% by weight. Next, the modified fibrous material may be coated with a standard industrial coating, or adhesive, which is compatible with the rubber in which the fibrous reinforcing material is to be embedded. As stated above, the coating is generally a mixture of a phenol-aldehyde resin and a vinyl pyridine polymer latex. In all cases the exact selection of the polymer latex components will be made to achieve compatibility with the rubber used in the final fiber-to-rubber composite. Preferably, the phenol-aldehyde resin will be prepared from resorcinol and formaldehyde, although other phenols such as hydroxy benzene, para-cresol, and pyrogallol can also be used. The mole ratio of phenolic compound to aldehyde in the phenol-aldehyde resin can be varied between about 1:1.02 to about 1:5. The phenol-aldehyde resin will generally be aged for a period of from about 0.5 to about 6 hours before mixing with the vinyl pyridine polymer latex. The said aging can be carried out at room temperature or elevated temperatures. For use with natural rubber and styrene-butadiene rubber the vinylpyridine polymer latex will preferably be a terpolymer of a vinylaryl monomer, a diene monomer, and a vinylpyridine monomer. The vinylaryl monomer will preferably be styrene, although other monomers such as vinyltoluene, etc., can be used. The diene monomers which can be used in preparing the polymer latex are open chain conjugated diolefins, including for example, 1,3-butadiene, isoprene, 2,3-dimethyl-1,3-butadiene, 1,2-diethyl-1,3-butadiene and piperylene. The vinylpyridine monomers most useful in preparing the polymer latex are alpha-vinylpyridine, 5-ethyl-2-vinylpyridine, and 2-methyl-5-vinylpyridine, although other monomers such as 5-butyl-2-vinylpyridine, 5-heptyl-2-vinylpyridine, 6-methyl-2-vinylpyridine, 4,6-dimethyl-2-vinylpyridine, and 2-methyl-4-vinylpyridine can be used. The vinylpyridine content of the terpolymer is usually from about 5% to about 25%, the vinylaryl monomer content from about 5% to about 35% and the diene monomer content from about 50% to about 85%. The rubber polymer latex can be admixed with the phenol-aldehyde-resin in ratios of between about 2:1 and about 10:1. Following the mixing of the two ingredients the pH will generally be adjusted to about 9.5 to about 10.5 using an inorganic base such as ammonium hydroxide.

The modified fibrous material can be coated with the conventional coating uniformly by dipping, spraying, running the material over a coated roll, or other conventional procedure. The coating will amount to from about 2% to about 10% by weight of the material. The coated material will then be cured for a short time such as from about 1 to about 10 minutes at a temperature of between about 250° F. about 450° F. The cured coating is a hard polymer which is very adherent to the modified fibrous material and produces excellent adhesion between the modified material and conventionally vulcanized rubber. It may be desirable in certain cases, to omit the latex coating thereby directly embedding the modified polyester fibrous material in a vulcanizable rubber stock and curing to obtain a reinforced rubber product. Such products reinforced with modified polyester fibrous material are superior to products reinforced with non-modified polyester fibrous material, but may exhibit a proportionate decrease in adhesive strength over those reinforced with modified fibrous material coated with the above described coating composition.

In the final step of the process of this invention the modified polyester fibrous material is embedded in the vulcanizable rubber stock to be reinforced and then the stock is vulcanized. Conventional vulcanization temperatures in the order of from about 275° F. to about 350° F. can be used. The rubber stock in which the modified polyester can be embedded includes natural rubber and synthetic rubbers such as styrene-butadiene rubber, ethylene-propylene-diene terpolymer rubbers, ethylene-propylene copolymer rubbers, polybutadiene, polyisoprene, and mixtures or blends thereof with suitable fillers, pigments, antioxidants, and cross-linking (i.e. vulcanizing) agents such as sulfur, dicumyl peroxide, and the like.

The following examples will serve to illustrate the invention, all parts and percentages being by weight unless otherwise indicated.

EXAMPLE 1

Poly(ethylene terephthalate) tire cord 1,000 denier and 3 ply under about 500 grams of tension is passed twice through a trough containing a 5% solution of 4-isocyanatobenzenesulfonyl azide in trichloroethylene. The cord is next passed through two ovens in series at 200° F. and 400° F. Residence times in the ovens are 65 and 54 seconds respectively. The cord dip pick-up is approximately 1.2% by weight.

The modified cord is next dipped in a resin latex prepared as follows: To a solution of 0.24 part of sodium hydroxide in 192.8 parts of water is added 8.8 parts of resorcinol with continued stirring until a complete solution is achieved. Then 12.2 parts of 37% formaldehyde are added. The solution is aged for approximately 5 hours at about 75° C. and then added slowly to a mixture of 48 parts water and 195 parts of a commercial latex comprising a 41% solids terpolymer of styrene, butadiene and vinyl pyridine. The monomers being present in a ratio of approximately 15:70:15. The mixture is stirred slowly for 15 minutes and its pH adjusted to 10.3 using concentrated ammonium hydroxide. The resulting gray-violet latex contains approximately 20% solids. The isocyanatosulfonyl azide modified cord is passed twice through a trough of the above described latex under a tension of 500 grams and then dried and cured for 54 seconds at a temperature of 430° F.

The thus coated cord is then vulcanized with a rubber tire stock in the form of ⅜ inch H-specimens. The rubber tire stock has the following formulation:

| Compounds: | Parts |
|---|---|
| Natural rubber (smoked sheet) | 80 |
| Styrene butadiene rubber | 20 |
| Semi-reinforcing furnace black | 25 |
| Zinc oxide | 5 |
| Stearic acid | 2 |
| Polytrimethyl dihydroquinoline | 1 |
| Heavy pine tar | 0.5 |
| Benzothiazoyl disulfide | 1 |
| Tetramethyl thiuram disulfide | 0.1 |
| Sulfur | 2.6 |

The test specimens are cured for 45 minutes at a temperature of 307° F. After several hours conditioning at room temperature the H-specimens are tested according to the procedure of ASTM–D–2138–62T. An average (6 test specimens) of 26 pounds is required to overcome the tire cord-rubber adhesion. A control specimen treated exactly the same as above except for the isocyanato-sulfonyl azide treatment gave an average of 17 pounds required to overcome the tire cord-rubber adhesion.

EXAMPLE 2

Vulcanized rubber tire stock is reinforced with poly(ethylene terephthalate) tire cord exactly as described in Example 1 except for the dip in the resorcinol-formaldehyde latex. Test specimens are prepared and tested exactly as described in Example 1. Those specimens treated with the 4-isocyanatobenzenesulfonyl azide require substantially more pounds of force to overcome the tire cord-rubber adhesion than do the control specimens.

What I claim and desire to protect by Letters Patent is:

1. In a process of adhering fibrous polyester reinforcing material to rubber stock, the improvement of first contacting said fibrous material with an isocyanato substituted aromatic sulfonyl azide having the formula $$(N_3O_2S)_x-A-[(R)_y-NCO]_z$$

wherein A is an aromatic radical, R is an organic radical selected from alkylene, unsaturated alkylene, cycloalkylene and arylene radicals, y is an integer from 0 to 1 and x and z are integers from 1 to 5 and heating the thus contacted fibrous material at a temperature sufficient to substantially decompose the sulfonyl azide groups on the isocyanato substituted aromatic sulfonyl azide.

2. The process of claim 1 wherein the isocyanato substituted aromatic sulfonyl azide is 4-isocyanatobenzenesulfonyl azide.

3. The process of claim 1 wherein the fibrous polyester reinforcing material is poly(ethylene terephthalate) tire cord.

4. A vulcanized rubber product reinforced with fibrous polyester reinforcing material said material having been first modified by heating with a small amount of an isocyanato substituted aromatic sulfonyl azide having the formula $$(N_3O_2S)_x-A-[(R)_y-NCO]_z$$

wherein A is an aromatic radical, R is an organic radical selected from alkylene, unsaturated alkylene, cycloalkylene and arylene radicals, y is an integer from 0 to 1, and x and z are integers from 1 to 5.

5. A fibrous polyester reinforcing material modified by reaction with an isocyanato substituted aromatic sulfonyl azide having the formula $$(N_3O_2S)_x-A-[(R)_y-NCO]_z$$

wherein A is an aromatic radical, R is an organic radical selected from alkylene, unsaturated alkylene, cycloalkylene and arylene radicals, y is an integer from 0 to 1 and x and z are integers from 1 to 5.

References Cited

UNITED STATES PATENTS

| | | | |
|---|---|---|---|
| 2,835,624 | 5/1958 | Cousins | 156—110 |
| 2,990,313 | 6/1961 | Knowles et al. | 156—110 |
| 3,503,845 | 3/1970 | Hollatz et al. | 161—184 |

JOHN T. GOOLKASIAN, Primary Examiner

C. B. COSBY, Assistant Examiner

U.S. Cl. X.R.

117—76T, 138, 8F; 152—359; 156—110, 308, 331, 338; 161—188, 190, 233, 241, 248; 260—75, 859, 873